(No Model.)
B. G. LAMME.
SYSTEM OF ALTERNATING CURRENT REGULATION AND DISTRIBUTION.
No. 571,836. Patented Nov. 24, 1896.
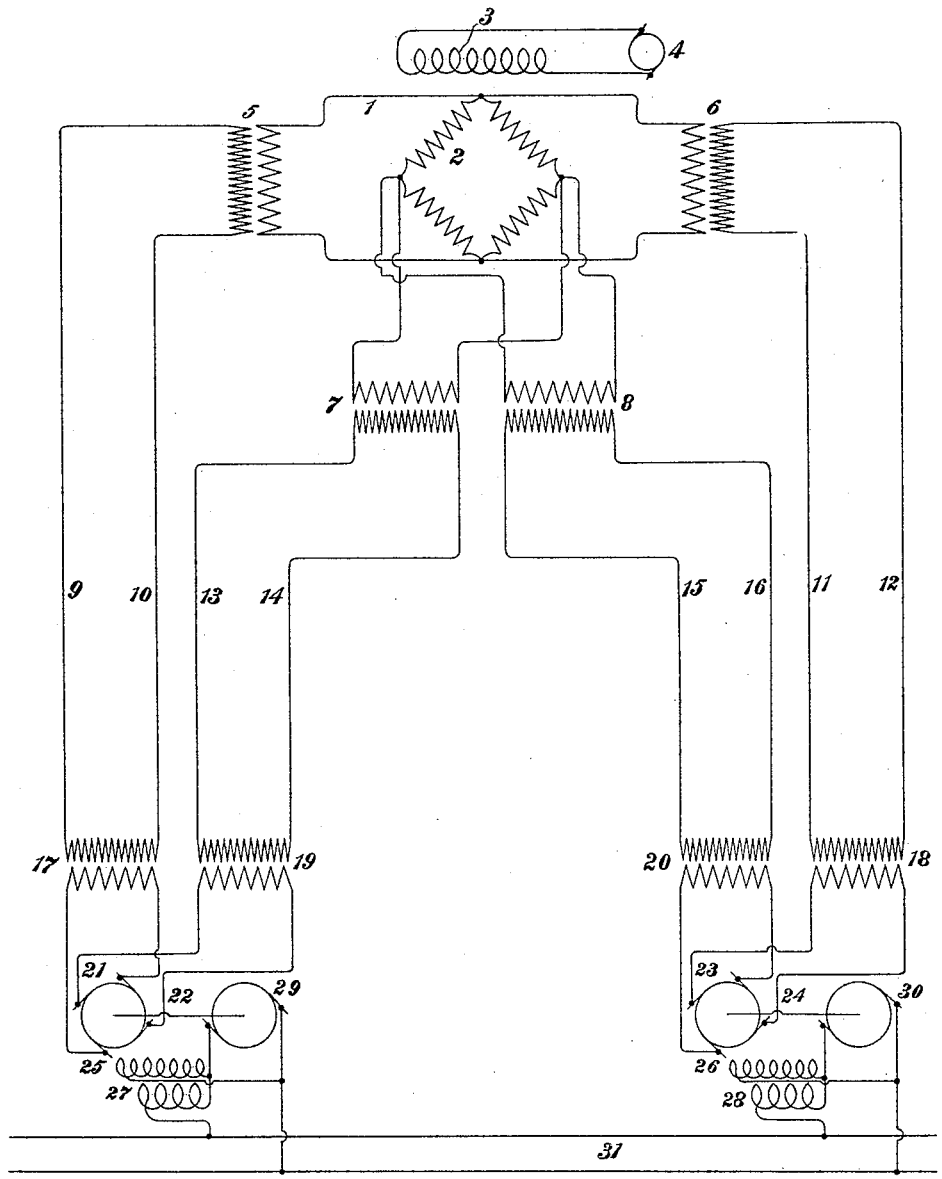
WITNESSES:
W. S. Weible.
Hubert C. Tener
INVENTOR
Benj. G. Lamme
BY
H. G. Carr
ATTORNEY

UNITED STATES PATENT OFFICE.

BENJAMIN G. LAMME, OF PITTSBURG, PENNSYLVANIA, ASSIGNOR TO THE WESTINGHOUSE ELECTRIC AND MANUFACTURING COMPANY, OF SAME PLACE.

SYSTEM OF ALTERNATING-CURRENT REGULATION AND DISTRIBUTION.

SPECIFICATION forming part of Letters Patent No. 571,836, dated November 24, 1896.

Application filed April 6, 1896. Serial No. 586,285. (No model.)

*To all whom it may concern:*

Be it known that I, BENJAMIN G. LAMME, a citizen of the United States, residing in Pittsburg, in the county of Allegheny and State of Pennsylvania, have invented a new and useful Improvement in Systems of Alternating-Current Regulation and Distribution, (Case No. 693,) of which the following is a specification.

My invention relates to alternating-current systems of distribution and regulation; and it has for its object to provide a means whereby the effect of self-induction in alternating-current-transmission circuits may be neutralized, and whereby the alternating-current generator supplying the circuit may be so regulated that it may supply a maximum amount of real energy to the circuit.

It is well known that all alternating-current circuits have more or less self-induction, the amount depending upon the length of the circuit and the number and character of the translating devices supplied by it. In cases where the work-circuit mains are located at a considerable distance from the generator and transformers are employed either for reducing the voltage at the work-circuit end of the feeders or for both raising the voltage at the generator end and reducing it at the work-circuit end the amount of self-induction is sufficient to introduce a considerable lag factor, which will materially reduce the amount of real energy available for use in the work-circuit. This current lag in the circuit also affects the operation and output of the generator, since it increases the armature reaction, which in turn weakens the field-magnet.

My present invention provides a means whereby a rotary transformer may be utilized for the transformation of alternating currents into direct currents, and at the same time serves to bring the alternating current into step with the electromotive force in the circuit, and to so regulate the generator that it will give a maximum output of real energy.

In the accompanying drawing, I have shown a diagram of circuits and machines illustrative of my invention, in which—

1 is a two-phase alternating-current generator, the armature of which is provided with an interconnected winding 2.

3 is the field-magnet winding excited by current from a suitable exciter 4. The armature-winding is tapped at four points, and two circuits for each phase are connected to the winding, as indicated. Step-up transformers 5 and 6 are supplied with currents of one phase and step-up transformers 7 and 8 with currents of a phase differing 90° therefrom. The secondary of the transformer 5 is connected with a transmission-circuit 9 10, the secondary of the transformer 6 with a similar circuit 11 12, the secondary of the transformer 7 with the circuit 13 and 14, and the secondary of transformer 8 with the circuit 15 16.

17 is a step-down transformer, the primary of which is connected with the circuit 9 10, and 18, 19, and 20 are similar transformers respectively connected with the several transmission-circuits 11 12, 13 14, and 15 16. The secondaries of the transformers 17 and 19 supply current to the alternating-current end 21 of a rotary transformer 22, and the secondaries of transformers 18 and 20 are similarly connected to the alternating-current end 23 of a rotary transformer 24. The field-magnets of these rotary transformers 22 and 24 are respectively provided with shunt-coils 25 and 26 and series coils 27 and 28. The current from the direct-current ends 29 and 30, respectively, of the rotary transformers 22 and 24 is supplied to mains 31 in the usual manner.

The armature construction of the rotary transformers is not illustrated, it being understood that it may be of any suitable character known in the art and provided with either a single winding or a plurality of windings.

In a system of apparatus and circuits like that shown and described the useful effect of the compound winding for the field-magnets of the rotary transformers obviously depends upon the presence in the alternating-current circuits of more or less self-induction. In fact the unavoidable presence of self-induction in such circuits is recognized, and it is the object of the present invention to provide a means whereby the injurious effects of such self-induction may be obviated. If the field-magnet windings of the transformers are properly proportioned and adjusted, the current through the series coils will increase as the load upon the circuit 31 increases, thus strengthening the field and accelerating the phase of the lagging currents in the alternating-current circuits supplying the transformers until the currents and corresponding electromotive forces are brought substantially into step, thus supplying the maximum amount of real energy to the transformers and reacting upon the generator 1, so as to bring its current and electromotive-force waves into step with each other, and thus reduce the armature reaction sufficiently to give a materially-increased output over what would be secured if the self-induction of the alternating-current circuit were permitted to have its usual effect upon the current flowing through the circuit.

While I have shown a two-phase generator and a specific combination of circuits and apparatus, I desire it to be understood that my invention is not limited to the generation and utilization of any particular number of phases of current or to apparatus of any specific construction apart from the field-magnet windings of the rotary transformer or transformers.

I claim as my invention—

1. A system of electrical distribution comprising an alternating-current generator, feeders supplied thereby, a direct-current circuit and a rotary transformer having a single compound-wound field-magnet and an armature located in the resultant field produced by said compound winding and connected to said alternating-current and direct-current circuits.

2. A system of electrical distribution comprising an alternating-current generator and its circuit, transformers included in said circuit, a direct-current work-circuit and a rotary transformer having a single compound-wound field-magnet, and an armature located in the resultant field produced by said compound winding and supplying current to said direct-current circuit.

3. The combination with an alternating-current generator and a direct-current work-circuit located at a distance therefrom, of a rotary transformer connected to the alternating-current feeders and supplying the direct-current circuit, the field-magnet of said transformer having shunt and series coils so proportioned as to counteract the phase lag in the alternating-current circuit and effect an increase in the electromotive force of the generator as the load on the direct-current circuit increases.

4. The combination with a source of alternating currents and a circuit supplied thereby, of a compound-wound rotary transformer having its field-magnet coils adjusted to counteract the phase lag in the alternating-current circuit as the direct-current-circuit load increases.

In testimony whereof I have hereunto subscribed my name this 1st day of April, A. D. 1896.

BENJ. G. LAMME.

Witnesses:
WESLEY G. CARR,
HUBERT C. TENER.